May 3, 1960
H. M. ESSINGTON
2,935,612
FLUORESCENT MATERIAL DETECTOR
Filed Aug. 25, 1958
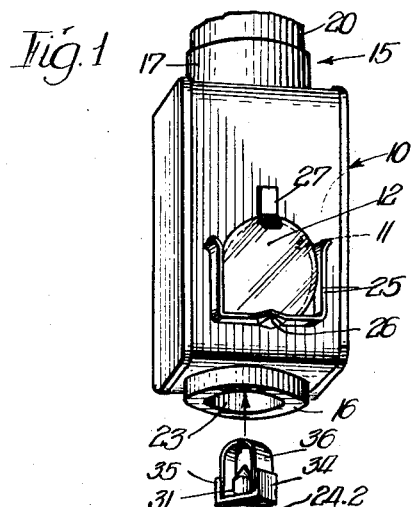
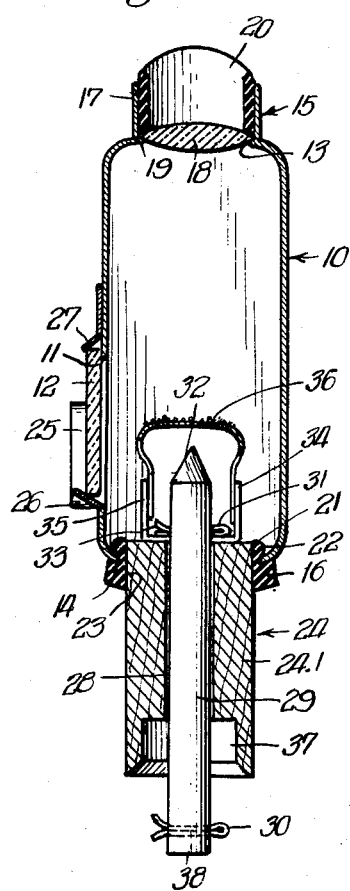
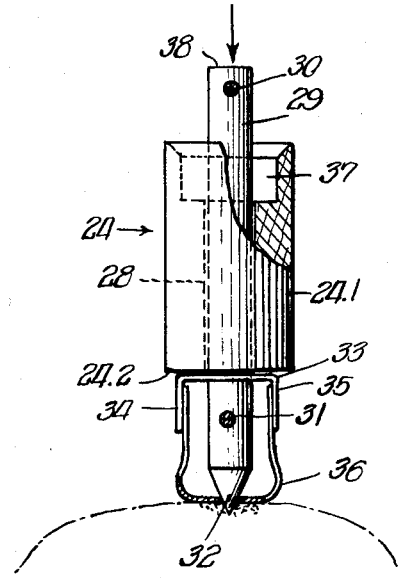
INVENTOR.
Harry M Essington,
BY
Bummuler + Snow
Attys.

United States Patent Office 2,935,612
Patented May 3, 1960

2,935,612

FLUORESCENT MATERIAL DETECTOR

Harry M. Essington, Santa Fe, N. Mex.

Application August 25, 1958, Serial No. 756,932

8 Claims. (Cl. 250—78)

This invention relates to an improved means for detection of the fluorescent characteristics of minerals and other materials in daylight and more particularly to an apparatus of this kind having an improved sample pickup means for obtaining and retaining samples of minerals or other materials to be tested and disposing the sample within the apparatus for fluorescent examination by daylight.

Various means for testing the character of minerals or other materials by fluorescent examination have been available heretofore but these have generally been restricted to night or dark room use. Although some devices have been adapted for day use, these have been extremely unwieldly and bulky and have required special lamp attachments to provide the fluorescing ultraviolet light. Furthermore, the method of testing such ores or materials has been extremely tedious and involved a number of steps, for example comminuting the rock to be tested, disposing it in a proper carrier, placing the material in a testing apparatus, and then directing ultraviolet light rays onto the sample to cause it to fluoresce.

Accordingly, the main objects of the present invention are to provide a more simple examining apparatus which is operable for on-the-spot testing of specimens in daylight without the necessity for transportation to a dark room; to provide an improved ore sample pickup device for breaking out samples of materials to be tested and then placing them in viewing position within a housing adapted to admit only ultraviolet light rays onto the test sample; to provide a light weight, pocket size, sample testing housing having a light admitting opening provided with a filter for screening out those portions of the light spectrum other than the ultraviolet range thereof whereby to fluoresce minerals or other materials disposed within the housing by daylight; to provide an improved ore pickup device having a sample collecting head adapted to simultaneously break up ores to be tested and retain the broken particles of such ores in firmly held distributed position thereon; to provide an improved impact head for the ore pickup device wherein a metallic break-up point is provided with a removable pressure sensitive adhesive ore particle collecting means; to provide a simplified examining device into which the ore sample pickup means may be bodily inserted for immediate examination by daylight; to provide such a device that is of a relatively small size, light weight, and simplified construction; and to provide an improved fluorescent mineral detector adapted to utilize the ultraviolet portion of light from the sun for fluorescing the samples to be examined and to permit the daytime examination of the samples without the need for an artificial light source.

A specific embodiment of this invention is shown in the accompanying drawings wherein:

Figure 1 is a perspective view of an improved fluorescent material detector showing both the viewing device and the specimen sampler or pickup device;

Fig. 2 is a vertical sectional view of the apparatus showing the specimen pickup device positioned in the viewer for examination of the specimen; and Fig. 3 is an elevational view of the sampler or pickup device, illustrating its manner of use to obtain a specimen for fluorescent examination.

In the form shown in the drawings, the improved fluorescent detector comprises a hollow housing or case 10, of generally rectangular configuration and made of any suitable opaque material, such as metal or plastic. The housing 10 is of light tight construction, and is provided with an annular opening 11, in one of its side walls, over which is mounted a filter 12, adapted to pass only the light rays from the ultraviolet portion of the daylight spectrum. The inside surfaces of the housing or casing 10 may be coated with a non-reflecting material, such as is used on the inner surfaces of cameras, so as to obviate any possibility of interference, from extraneous light rays, with the fluorescence of the material under examination.

In the form shown, the housing 10 is also provided with openings 13 and 14 in its opposite end walls for respectively mounting an eyepiece 15, and an annular rubber bushing 16 through which the specimen to be examined is introduced into the housing or case 10.

The eyepiece 15, as shown, comprises a collar 17 secured to the casing 10 in surrounding relation to the eyepiece opening 13, a magnifying lens 18 centered and resting on the margin 19 of the opening 13, and an open-ended eye cup 20, made of soft rubber or the like and shaped at its outer or upper end for light tight placement against the viewer's eye, the eye cup member 20 being formed to fit into and be retained by the holder collar 17 in light tight relation with the casing end wall and to bear against the margin of the magnifying lens 18 to hold it in place over the opening 13.

The rubber collar 16 at the opposite end of the casing 10 is preferably a molded ring having a collar portion 21 of less diameter than the main body of the ring and adapted to fit into the casing opening 14, the collar portion 21 having a peripheral bead 22 adapted to tightly engage the inner margin of the casing opening 14 so as to hold the ring 16 firmly in place against the casing end wall. The rubber ring or bushing 16 is preferably of a relatively soft material, sufficiently resilient to firmly hold its position in the casing opening 14, and provides an annular passage 23 through which the specimen sampler device 24 may be introduced into the interior of the casing 10. The opening 23 in the bushing 16 is preferably of substantially the same size and configuration as the body or handle portion 24.1 of the specimen sampler 24 so that when the sampler is inserted endwise into the bushing opening while grasped in the user's hand a substantially light tight seal is provided around the sampler body.

In the construction illustrated herein, the ultraviolet ray filter 12 is mounted in a U-shaped saddle 25, made of a resilient metal, suitably mounted on the side wall of the casing 10 so as to extend transversely of the casing below the margin of the opening 11, with its legs extending upwardly on each side of the opening 11. As shown, the central portion of the saddle 25, between the upright legs, is upset as at 26 so as to engage the margin of the filter 12 and press the filter tightly against the margin of the casing opening 11; and the upper marginal portion of the filter 12 is held against the casing 10 by means of an overhanging clip 27 which is suitably attached to the casing 10 immediately above the opening 11. Thus the filter 12 is firmly held against the casing margin of the opening 11 and the only light rays that can pass into the casing through the opening 11 will be those transmitted by the filter 12. The filter 12 is removable from the saddle 25 by merely flexing the saddle downwardly until the upper edge of the filter passes the overhanging clip 27, and then lifting the filter from the saddle 25. The filter 12 is replaced by first inserting its lower margin into the saddle 25 behind the upset portion 26 and then pressing downwardly on the saddle until the upper edge of the filter passes beneath the clip and against the facing side wall. The filter 12 may be of any suitable material. However I have found Corning #9863 filter glass to be satisfactory.

In the form shown the sampler device 24 comprises a cylindrical handle or body 24.1 of wood or other suitable material, having an axial passage 28 extending therethrough in which is slidably mounted a pointed hard metal impact rod 29. The rod 29 is somewhat longer than the body 24.1, so as to project beyond each end thereof, and is transversely drilled adjacent each end to receive cotter pins 30 and 31 which limit the axial movement of the impact rod 29 in the body or handle 24.1.

As shown, the end 24.2 of the handle, adjacent the pointed end 32 of the impact rod 29, is provided with a U-shaped bracket 33 slidably mounted on the impact rod 29 and having flat, mutually facing, axially projecting legs 34 and 35 spaced apart, on diametrically opposite sides of the rod 29, sufficiently to clear the cotter pin 31. This bracket functions as a mounting means for a specimen holding tape 36 as will be hereafter described. The opposite end of the handle 24.1 is counterbored as at 37 so as to provide a socket or well into which the cotter pin 30 and the flat end 38 of the impact rod 29 may be received. Thus the counterbore 37 provides a cup into which the flat end 38 of the rod can be held below the end margin of the handle 24.1 when the handle is in inverted position. The purpose of this arrangement will be hereafter explained.

In the use of the improved apparatus for observing the fluorescene of material to be tested, comminuted particles of dry materials are held by means of the pressure sensitive adhesive tape 36, supported by the bracket legs 34 and 35, the bracket legs 34 and 35 together with the tape 36 comprising the dry-specimen carrying end of the sampler device 24. This specimen carrying end of the sampler device is introduced into the viewing housing or casing 10 by insertion endwise through the opening 23 in the rubber bushing 16, while the handle portion of the sampler device is held in the user's hand, and the specimen carrying tape is manually guided into the casing 10 to such a position that ultraviolet light rays passing through the filter 12 will fall upon the specimen particles and cause them to fluoresce. The casing 10 is then turned to such a direction as to receive light rays from the open sky or from the sun, while being held in the user's other hand, and the user's eye is placed against the soft rubber eye cup 20 whereupon the fluorescence of the specimen particles carried by the tape 36 can be readily observed.

It will be understood that during such examination the sampler device 24 may be moved axially in the bushing 16 so as to best position the specimen carrying surface of the tape 36 relative to the filter 12 for the reception of the ultraviolet rays that cause the specimen to fluoresce.

If the material to be examined is a liquid the sampler device is inverted so that the flat end 38 of the impact rod 29 falls into the cup portion 37 of the sampler device, and a drop of the liquid to be tested is then placed upon the flat end 38. The counterbored end of the sampler device is then inserted into the casing 10 through the bushing 16 to a position such that the specimen may be fluoresced, by the ultraviolet rays entering through the filter 12, and the fluorescence can be observed through the eyepiece 20.

In the case of either dry materials or a liquid the magnifying lens 18 will serve to enlarge the image passing to the observer's eye and thus facilitate accurate detection of the various kinds of fluorescence that may be emitted from the specimen under test.

It will now be observed that the sampler 24 is a combination specimen carrier and particle break-out device, the sampler in its latter function serving as a tool by means of which small particles of a material may be broken out of a larger body and automatically picked up and retained for immediate examination in the viewer or housing 10.

For such use the sampler 24 is held with the pointed end 32 of the impact rod 29 against the body of material from which the specimen is to be taken, and the flat or blunt end of the impact rod 29 is then struck with a pocketknife handle or other suitable means so as to drive the point 32 into the material body and shatter or break out particles therefrom. In order to trap and retain these small particles a piece of pressure sensitive adhesive material 36 is mounted on the specimen carrier bracket arms, with its adhesive surface outward, so as to form a loop over the point 32 of the impact rod when the sampler is held vertically with the point up, the pressure sensitive material being mounted on the legs 34 and 35 by pressing the adhesive surface of the ends of the material piece against the inner surfaces of the legs. The loop of material spanning the space between the legs is preferably of such size as to leave a space of about one-eighth to one-quarter of an inch between the point 32 and the adhesive material.

When the pressure sensitive adhesive material has been thus applied, the sampler is inverted with the point of the rod down and resting against the adhesive material and the point is placed against the area on the body of material from which a sample is desired to be taken. The sampler handle is then pressed toward the body to the limit allowed by the cotter pin 31. This causes the pressure sensitive adhesive material to spread somewhat over the surface of the body from which a sample is to be taken, and when the blunt end of the impact rod 29 is struck the small particles shattered from the body will be picked up and held by the adhesive surface of the material 36. This operation may be repeated several times by shifting the sampler to various other places on the body from which specimens are to be taken until a sufficient quantity of particles have been obtained or until the adhesive material has become covered with the particles.

During the sampling procedure the point 32 of the impact rod 29 will, if course, penetrate the adhesive material 36 so as to have direct contact with the material body from which the particles or specimens are to be broken out. When the sampler is inverted, however, for insertion of the specimen carrying end of the sampler into the viewer housing 10, the point 32 will drop back away from the adhesive material 36 so that the somewhat flattened loop portion only of the material, which carries the specimen particles, will be observed through the eyepiece of the viewer.

When a sufficient quantity of specimen particles have been obtained on the sample retaining pressure sensitive material, the sampler is inserted into the viewer a sufficient distance to position the particle bearing area opposite the filter 12, and the viewer is held in a substantially vertical position with the filter facing the open sky or the sun. The observer, by placing his eye against the eye-piece, will then be able to observe the specimen particles for their fluorescense. During the viewing operation the sampler should be slowly turned or rotated several times so as to bring all of the specimen particles within the influence of the ultraviolet light rays entering the viewer through the filter 12. Sharp focus with respect to the magnifying lens 18 is obtained by moving the sampler axially inward or outward of the viewer casing.

The sample pick-up material is preferably a cellophane pressure sensitive adhesive tape of half inch width, and a strip length of about one and one-half inches is usually sufficient for specimen pick-up purposes. It will be understood, however, that substantially any kind of pressure sensitive adhesive material may be employed for this purpose. Transparent cellophane tape is preferred because the specimens can be preserved by merely covering them with another length of the same material, after removal from the sampler device, and the covered tapes can be readily stored in an envelope or other container for future reference or study.

Miscellaneous rock samples may be tested for fluorescense in the herein described apparatus by placing the samples, up to one inch in diameter, in the cup portion 37 of the inverted sampler device and then inserting this cup portion just far enough into the viewer casing 10 to place the samples opposite the filter 12 where they can be influenced by the ultraviolet rays passing through the filter. All powdered and finely divided materials, however, should be picked up by means of the pressure sensitive adhesive material mounted on the specimen carrying end of the sampler device.

It will now be seen that I have provided an extremely simple and compact fluorescent mineral detector apparatus that can be used by prospectors, geologists, miners, and rock collectors at any place and in full daylight; and that the device can be made of such size that it may be readily carried in the user's coat pocket. Commercial adaptations of this invention have been made with a viewer or housing size of about three and one-half inches high, one and seven-eighths inches wide, and one and one-half inches deep, and with a sampler body of one inch in diameter and an over-all length of two and seven-eighths inches.

The main advantages of this invention besides its relatively small size and simple light-weight structure, resides in the fact that the sampler device simultaneously cuts out and picks up the specimen particles to be observed for fluorescence under the influence of ultraviolet light, and the viewer housing proves a means for immediate on-the-spot examination of the samples, thereby obviating the necessity of taking and preserving samples for later examination in a dark room. Other advantages are to be found in the fact the apparatus can be used for testing ores and other miscellaneous materials as well as rock fragments; in the fact that the apparatus may be operated on light from the sun thereby obviating the need for carrying any ultraviolet lamp apparatus; and in the fact that the apparatus is of simple durable construction having no moving parts to get out of order, and requiring no batteries or other elements of limited life.

Although but one specific embodiment of this invention has been herein shown and described, it will be understood that numerous details of the construction shown may be altered or omitted without departing from the spirit of this invention as defined by the following claims.

I claim:

1. An apparatus for testing fluorescent materials in daylight comprising an opaque housing, means for selectively introducing ultraviolet light rays into said housing, and a specimen pickup tool for collecting and retaining materials to be tested; said tool including a handle having a predetermined cross-sectional configuration, and a specimen carrying means at one end of the handle; and said housing having an inlet opening having a cross-sectional configuration complementary to that of said handle for receiving the handle and the specimen carrying end of said tool into the housing while substantially excluding extraneous light from the housing, a resiliently flexible collar on said housing surrounding said inlet opening for peripherally engaging said handle to close said opening, and means for viewing the specimen carrying end of the tool while in the housing and under the influence of the ultraviolet light rays introduced into the housing.

2. An apparatus for testing fluorescent materials in daylight comprising an opaque housing, filter means for selectively introducing ultraviolet light rays of sunlight into said housing, a specimen pickup tool for collecting and retaining materials to be tested, said tool including a handle having a predetermined cross-sectional configuration and a specimen carrying means at one end of the handle, one wall of said housing defining an inlet opening having a cross-sectional configuration complementary to that of said handle for receiving the specimen carrying end of said handle into the housing in position to receive light rays introduced by said filter means, a resiliently flexible collar surrounding said inlet opening for peripherally engaging said handle to exclude the passage of daylight into the housing therealong, viewing means including a magnifying lens on said housing for receiving therethrough light reflected from materials on the specimen carrying end of said handle, and an eyepiece member surrounding said viewing means for excluding daylight from the housing while viewing the specimen.

3. The method of testing minerals for fluorescence which comprises the steps of placing the adhesive surface of a pressure sensitive adhesive tape against a body of the mineral to be tested, driving a pointed tool through the tape and into the mineral body to break out mineral particles therefrom and adhere the particles to the adhesive surface of the tape, and then subjecting the particle carrying surface of the tape to the influence of utraviolet light while excluding all other light rays therefrom and examining the resultant fluorescence of the said particles.

4. A mineral sampler device comprising an elongate handle member having a solid metal rod extending axially therethrough and extending beyond one end thereof to terminate in a point, and means on said handle member adjacent the point of said rod for supporting a transversely disposed outwardly facing strip of adhesive coated material for trapping and retaining mineral particles produced by impact of said point against a mineral body.

5. A mineral sampler device comprising an elongate handle member, a metal rod extending axially through said handle member and having a pointed end projecting beyond one end of the handle member, and adhesive coated means on said one end of the handle and extending transversely with respect to the axis of said metal rod for trapping and adhesively retaining mineral particles broken from a mineral body by impact of the pointed end of said rod thereagainst, the adhesive coating on said means being on the outwardly facing surface thereof and normally in a tacky state.

6. A mineral sampler device comprising a generally cylindrical handle having an axial bore therethrough, a metal rod extending through said bore and projecting beyond one end of the handle to terminate in a point, and a pair of arms extending in the axial direction from said one end of the handle and being in diametrically spaced relation with said rod, said arms being adapted for supporting a strip of pressure sensitive adhesive material in a position spanning the ends of the arms and across the pointed end of said rod.

7. A mineral sampler device comprising a generally cylindrical handle having an axial bore therethrough, a metal rod extending through said bore and projecting beyond one end of the handle to terminate in a point, a pair of arms extending in the axial direction from said one end of the handle and being in diametrically spaced relation with said rod, said arms being adapted for supporting a strip of pressure sensitive adhesive material in a position spanning the ends of the arms and across the pointed end of said rod, said rod being axially slidable in said bore, and means for limiting the axial movement of said rod in said bore.

8. A mineral sampler device comprising a generally cylindrical handle having an axial bore therethrough and a pair of flat diametrically spaced arms extending in face to face relation from one end of the handle and in the axial direction therefrom, the other end of said handle having a counterbore, a metal rod slidably disposed in the bore of the handle and having a pointed end extending between said arms, and means to limit the movement of said rod in either axial direction in said bore while permitting the end of the rod adjacent said counterbore to be received within the counterbore, said arms being adapted to support a loop of pressure sensitive adhesive material in position to span the space between the ends of the arms and across the pointed end of said rod.

References Cited in the file of this patent

UNITED STATES PATENTS

| | | |
|---|---|---|
| 2,486,026 | Hills | Oct. 25, 1949 |
| 2,831,120 | Weeks | Apr. 15, 1958 |
| 2,843,362 | Degen | July 15, 1958 |
| 2,860,515 | Brown | Nov. 18, 1958 |
| 2,865,204 | Lamb | Dec. 23, 1958 |
| 2,874,302 | Mallory et al. | Feb. 17, 1959 |